(12) United States Patent
Oehlert et al.

(10) Patent No.: US 8,845,376 B2
(45) Date of Patent: Sep. 30, 2014

(54) FLOTATION VEST HAVING AN INTEGRAL WORK SURFACE

(75) Inventors: Jeremy D. Oehlert, Wichita, KS (US); Jake L. Hillard, Wichita, KS (US)

(73) Assignee: The Coleman Company, Inc., Wichita, KS (US)

( * ) Notice: Subject to any disclaimer, the term of this patent is extended or adjusted under 35 U.S.C. 154(b) by 0 days.

(21) Appl. No.: 13/053,593

(22) Filed: Mar. 22, 2011

(65) Prior Publication Data

US 2012/0244768 A1  Sep. 27, 2012

(51) Int. Cl.
   *B63C 9/08* (2006.01)
   *B63C 9/11* (2006.01)
   *A45F 5/02* (2006.01)

(52) U.S. Cl.
   CPC .... *B63C 9/11* (2013.01); *A45F 5/02* (2013.01)
   USPC ......................................................... 441/106

(58) Field of Classification Search
   USPC ............. 441/80, 88, 106, 107, 108, 111, 112, 441/113, 114, 115, 116, 117, 118, 119, 122, 441/123, 129
   See application file for complete search history.

(56) References Cited

U.S. PATENT DOCUMENTS

| | | | |
|---|---|---|---|
| 2,717,391 A | 9/1955 | Bracken | |
| 2,853,709 A | 9/1958 | Peterson et al. | |
| 4,523,914 A * | 6/1985 | Faulconer et al. | 441/108 |
| 5,063,614 A | 11/1991 | McSheffery | |
| 5,247,707 A | 9/1993 | Parker et al. | |
| 5,465,425 A | 11/1995 | Crispin | |
| 5,526,535 A | 6/1996 | Dobrzenski | |
| 5,913,409 A | 6/1999 | Test | |
| 6,119,269 A | 9/2000 | Imler et al. | |
| 6,216,272 B1 | 4/2001 | Rosengren et al. | |
| 6,511,357 B1 * | 1/2003 | Williams et al. | 441/106 |
| 6,618,981 B1 | 9/2003 | Rodriguez | |
| 6,910,224 B2 * | 6/2005 | Ikenaga et al. | 2/102 |
| 7,013,596 B1 | 3/2006 | Moore | |
| 7,028,341 B2 * | 4/2006 | Ikenaga et al. | 2/102 |
| D521,234 S | 5/2006 | Le Coq et al. | |
| 2005/0011108 A1 | 1/2005 | Noraker | |

FOREIGN PATENT DOCUMENTS

| | | |
|---|---|---|
| JP | 11012812 | 1/1999 |
| JP | 2000054209 | 2/2000 |
| JP | 2002088546 | 3/2002 |

* cited by examiner

*Primary Examiner* — Daniel V Venne

(57) ABSTRACT

A fishing vest is provided having a degree of flotation to assist the angler in the water and also having an auxiliary pack located in the front of the vest which provides an integral and portable work surface for creating or repairing fishing flies and lures and also provides integral storage for tools and fishing tackle.

7 Claims, 3 Drawing Sheets

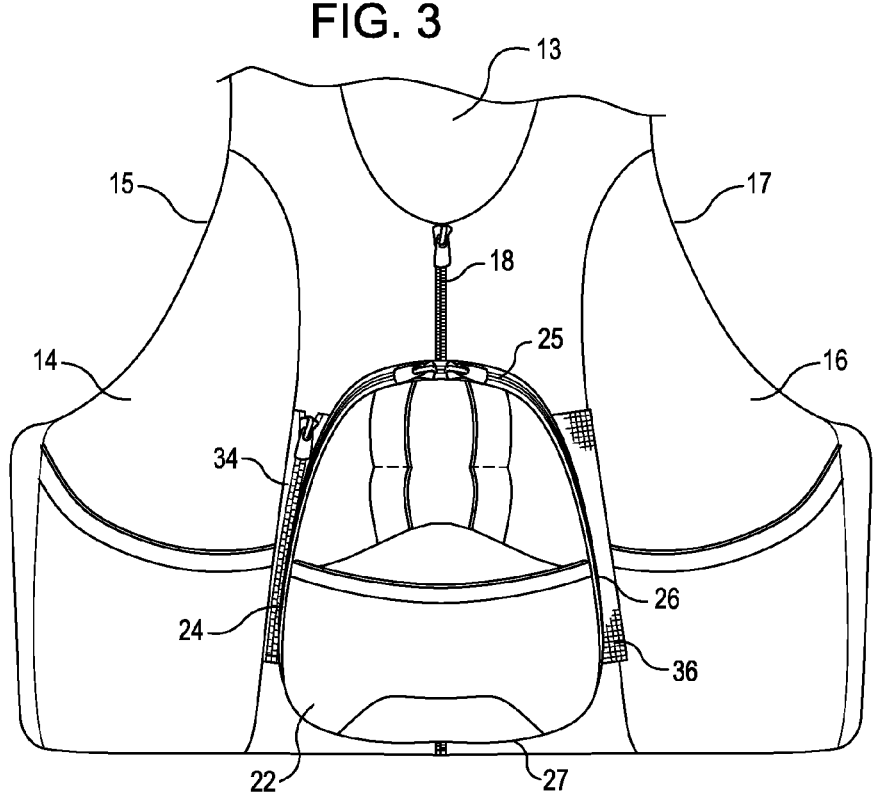
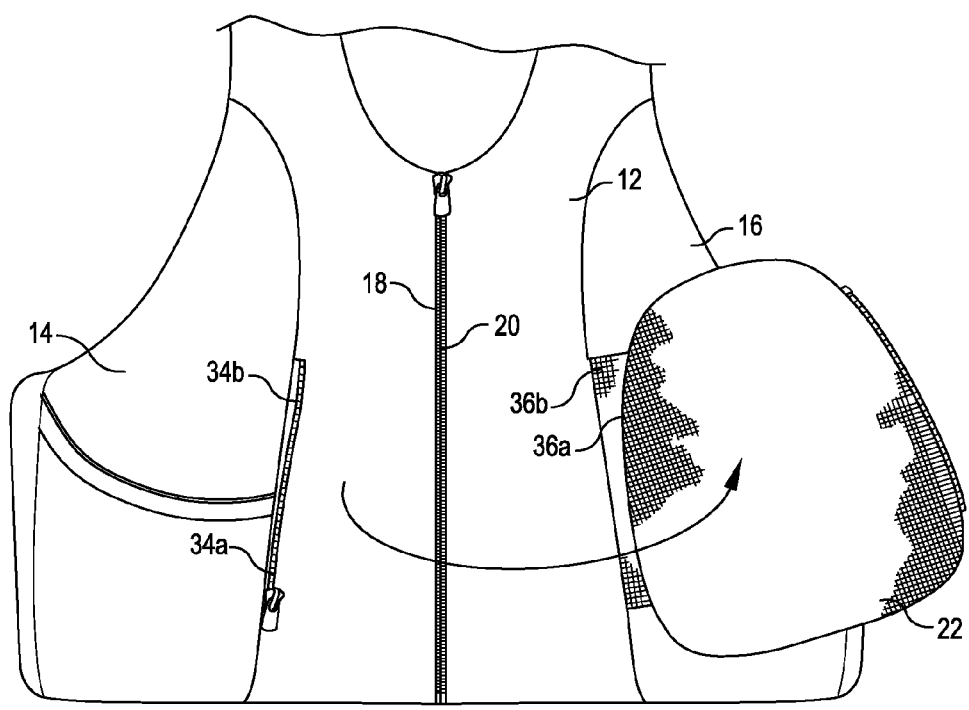

FLOTATION VEST HAVING AN INTEGRAL WORK SURFACE

REFERENCE TO RELATED APPLICATIONS

None.

FIELD OF THE INVENTION

The present disclosure relates to personal flotation devices, and more particularly to a vest having an integral work surface and fishing tackle storage pocket.

BACKGROUND OF THE INVENTION

The recreational sport of fishing, often called angling, as contrasted with commercial fishing, involves the use of rods, reels, lines, and lures with hooks to catch fish. Sport angling, one of the more popular forms of recreation in the world, lets people get into the outdoors for the challenge of outwitting and then fighting a game fish.

Modern sportfishing may be broken down between freshwater fishing and saltwater fishing. Freshwater fishing takes place in lakes, ponds, rivers, and streams. Saltwater fishing is done in the ocean and rivers affected by ocean tides. Fish in fresh water are generally smaller than fish found in sale water. Accordingly, freshwater fish are caught with lighter rods, reels, and lines and with smaller lures than saltwater fish. In lakes, ponds, and larger rivers, freshwater anglers either wade, fish from shore, or use a boat. Anglers fishing in smaller rivers, streams, and creeks generally wear waders and/or waterproof garments, including a vest which may have a certain degree of flotation for safety. The angler walks in the water to a suspected fish collecting area.

Freshwater anglers can utilize different fishing methods such as bait casting, spin fishing and fly fishing. Fly fishing is thought to be the most sporting and difficult angling method and is primarily used to catch trout and salmon. A fly rod is typically of 7½ feet, and up to 10 feet, in length is used. This rod is lighter than rods used for bait and spin fishing.

Fly reels are also different from bait casting and spinning reels in that they are of a single action. Fly reels have a frame and revolving spool without gears, designed to only hold the line. The handle is attached directly to the spool. A turn of the handle turns the spool.

Fly lines are thicker in diameter than bait casting lines and are coated with various plastics. Some can float or sink rapidly or slowly. Once the fly fishing line is wound on the reel spool, a nylon leader is added to the end of the line. Fly leaders are much lighter than and have a smaller diameter than the actual fly line. The fly leaders let the angler cast easily.

A fly is attached to the end of the leader to disguise the hook. The fly is made of feathers, fur, silk, hair, or synthetic materials tied onto a hook. Different shapes and sizes are used to imitate a variety of insects, frogs and even mice. The fly is of very little weight. The choice of irritated insect is based upon what fish are feeding on at a particular moment. The majority of anglers "tie" their own flies meaning that they create their own flies by tying the feather, fur, silk, hair or synthetic material onto the hook with string. Anglers tend to carry a variety of different flies with them when fishing so that they can adjust the type of fly for different locations and circumstances.

To cast a fly line, the angler whips the fly rod back and forth until a desired length of line is moving through the air. The line is then cast to a spot, such as pools and pockets in streams where fish may gather. The fly is allowed to touch the water and then float or sink into the water. If a fish goes for the bait, the angler sets the hook in the fish's mouth by pulling the line by raising the top of the rod. The angler fights the fish by pulling the line by hand or by reeling in the line onto the reel.

Fishing with flies involves many variations and subtleties. Serious anglers constantly search for new information about equipment that will help them improve their fishing. One area of improvement is the comfort level of the angler and the ability to make, repair and select different flies without leaving the water.

SUMMARY OF THE INVENTION

The present disclosure provides a fishing vest having a degree of flotation and including an auxiliary pack secured to the front portion of the vest. The auxiliary pack comprises first and second sections hingedly attached to each other wherein an integral work surface is accessible by rotating a portion of the auxiliary pack about the hinge. The auxiliary pack is secured to the front of the vest and overlies a central opening of the vest. The auxiliary pack also including an integral storage portion.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 3 is a partial front view of the flotation vest of FIG. 1, showing the auxiliary pack fully secured to the vest and the work surface in the closed configuration; and FIG. 4 is a partial front view of the flotation vest of FIG. 1, showing the auxiliary pack partially secured to the vest.

DETAILED DESCRIPTION OF THE INVENTION

Figure 1:
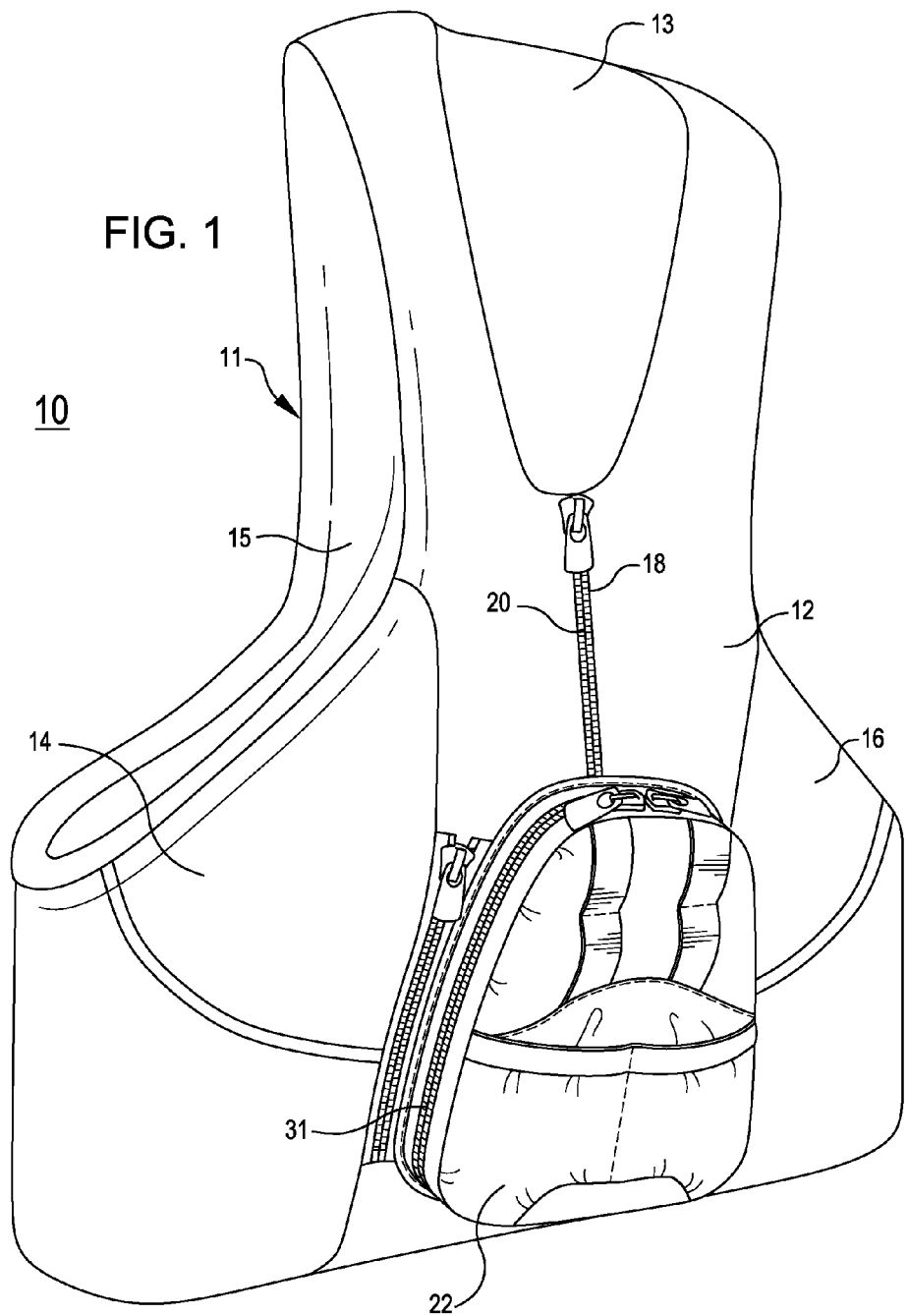
FIG. 1 is a front perspective view of a flotation vest of the present disclosure, showing the auxiliary pack fully secured to the vest and the work surface in a closed configuration.

Referring now to the drawing figures in which like reference designators refer to like elements, there is shown in FIG. 1 a flotation vest 10 of the present disclosure. The vest 10 includes a body section 11 for fitting around a torso of the user. A head opening 13 and arm holes 15, 17 are provided for fitting the vest 10 onto a user. A fastener 18, such as a zipper, is positioned along a front 12 of the vest 10 for allowing release and attachment of the vest 10 to a user. Front 12 of vest 10 includes two generally symmetrical side portions 14, 16. The two side portions 14, 16 are releasably connected by fastener 18. It is within the scope of the present invention, for fastener 18 to comprise other connecting means known in the industry such as buttons, snaps, toggles, hook and loop material and the like. Fastener 18 is preferably located along an axis located at the center front 20 of vest 10.

As shown in FIGS. 1-4, auxiliary pack 22 is located on vest front 12 and preferably spans the center front 20 closure axis of vest 10. Auxiliary pack 22 comprises first side 24, second side 26, top side 25 and bottom side 27. As shown in the figures, first side 24 is preferably releasably secured to a first edge 34a of first connecting panel 34 via a zipper closure or other known releasable connecting mechanism known in the industry such as hook and loop material, buttons, snaps and the like. The second side 26 of auxiliary pack 22 is preferably secured to a first edge 36a of second connecting panel 36. While the present figures depict a generally permanent securement of second side 26 of auxiliary pack 22 to second connecting panel 36 via stitching, it is also within the scope of the present invention for second side 36 of auxiliary pack 22 to be releasably secured to second connecting panel 26 on second side 16 of vest in a manner similar to the first side 34 of auxiliary pack 22 just described.

As shown in FIGS. 3 and 4, second edge 34b of first connecting panel 34 is secured to first side 14 of vest 10, preferably via stitching or other similar method. Second edge 36b of second connecting panel 36 is similarly secured to second side 16 of vest 10. It is also within the scope of the present invention for first connecting panel 34 to be entirely comprised of a zipper and no additional material or panel such that the first edge 34a comprises one side of the zipper and the second edge 34b comprises the opposite mating side of the zipper.

In use, the vest may be easily and quickly donned and the auxiliary pack 22 fully secured for use without the need for additional straps around the neck or waist of the user. The auxiliary pack 22 secures to the vest 10. The user of the vest 10 dons the vest in the traditional fashion by inserting each arm through arm holes 15, 17 respectively and closing fastener 18 to secure the vest 10 around the user's torso. At this point, the auxiliary pack 22 is not fully secured to the vest, as depicted in FIG. 4. Once the vest 10 is secured, the user may rotate the auxiliary pack 22 over the vest closure 18 via the second connecting panel 36 to a configuration shown in FIG. 3 and secure first side 24 of auxiliary pack to first side 14 of vest along first connection panel 34. As can be seen in FIG. 3, once fully donned and secured, auxiliary pack 22 spans the center front 20 closure axis of vest 10.

Figure 2:
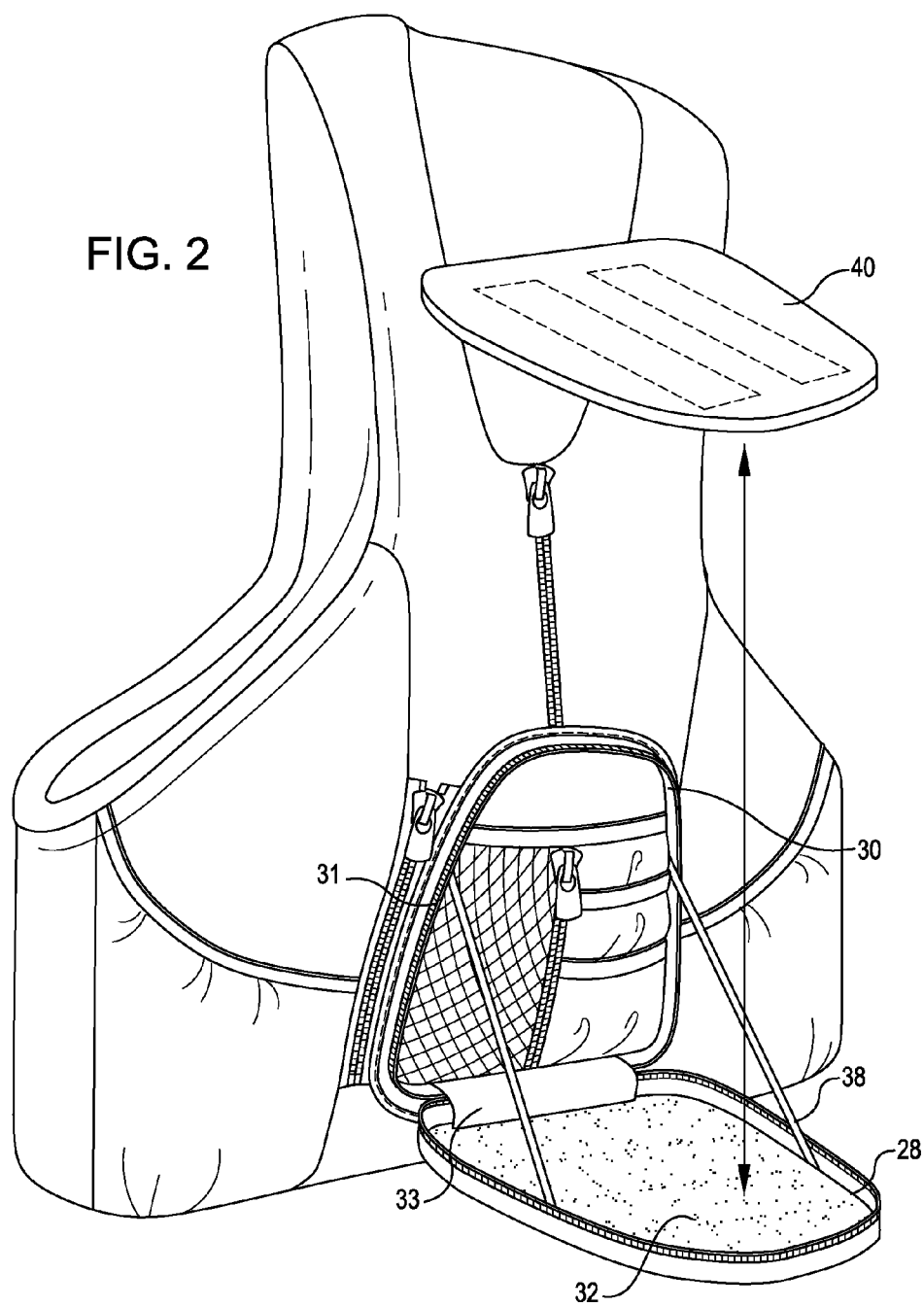
FIG. 2 is a front perspective view of the flotation vest of FIG. 1, showing the auxiliary pack fully secured to the vest and the work surface in an open configuration, also showing a removable auxiliary pack insert in an exploded view.

As shown in FIGS. 1 and 2, auxiliary pack 22 may comprise numerous pockets, cords, straps and other decorative and functional elements as are known and used with conventional fishing vests and life vests. As shown more clearly in FIG. 2, front section 28 of auxiliary pack 22 is separable from back section 30 of auxiliary pack to create a work surface 32. Front section 28 and back section 30 are preferably releasably connected to each other via zipper 31, but other connecting means known in the industry are also within the scope of the present invention, such as hook and loop material, snaps, buttons, toggles and the like. Even when zipper 31 is fully released (as shown in FIG. 2, front section 28 and back section 30 of auxiliary pack 22 remain connected at hinge 33 made of fabric or the like at the bottom 27 of auxiliary pack so that front section 28 rotates forward and down from orientation of wearer to create the work surface 32.

Work surface 32 is located on the interior side of front section 28 and comprises at least one retainer 38 which is preferably a strap, cord or other mechanism to retain front section 28 in an approximate 90-degree angle orientation with back section 30. Preferably, two retainers 38 are utilized. As shown, the interior may comprise pockets, loops and other utilitarian mechanisms useful for anglers. Work surface 32 preferably comprises felt or wool that is known and used for retaining lures and flies by providing material into which the hooks can be removably secured. Auxiliary pack 22 may comprise a removable insert 40 for providing additional storage or work surface for flies and lures. Insert 40 may be covered in felt, wool or other material useful for anglers and fly fishermen. Insert 40 and inside of auxiliary pack 22 may also comprise various pockets, loops and the like to allow the user to carry string, tools, pliers, hooks, fur, feathers, etc. as needed to angling.

In an embodiment of the present invention, auxiliary pack 22 may be wholly removable from vest front (not shown) by utilizing a second removable attachment means along second side 26 of auxiliary pack 22 along second connecting panel 36. It is also within the scope of the present invention for second side 26 of auxiliary pack to be removable from vest 10 while first side 24 of auxiliary pack 22 remains permanently secured to vest 10. At least one of the attachments at either first connecting panel 34 or second connecting panel 36 are removable attachments as shown in FIG. 4. Auxiliary pack 22 is capable of releasable attachment at one side 14 and rotation about an axis of attachment on a second side 16, or vice-versa.

Although front side portions 14, 16 are depicted as generally symmetrical and connecting to each other at the approximate center front 20 of vest 10, it is also within the scope of the present invention for the vest 10 to comprise front 12 and back 19 sections that interconnect at one or both sides (not shown) or for the front 12 to comprise two sides which are not generally symmetrical (not shown) and which interconnect using fastener 18 along a line that is off-set from the center front 20.

Vest 10 can have various degrees of flotation in the vest via inflation or foam material or the like. It is within the scope of the present invention for vest 10 to comprise virtually no additional flotation assistance or to comprise a large degree of flotation assistance. It is also within the scope of the present invention for vest 10 to be made of various materials known in the industry such as mesh, canvass, nylon, neoprene or other materials known and used for fishing vests or life vests.

All references cited herein are expressly incorporated by reference in their entirety.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A flotation vest comprising:
a body portion comprising a back portion and a front portion, said front portion comprising a first front portion releasably attached to a second front portion by a front closure located in a center of the front portion; and
an auxiliary portion, the auxiliary portion comprising at least a back section and an opposite front section, the front section defining a work surface, wherein the back section is connected to said front portion of the body portion and is hingedly attached to said front section of the auxiliary portion via a hinge, the work surface being accessible and rotated from a closed configuration to an open configuration by rotating the work surface about the hinge, wherein at least a portion of the auxiliary portion overlies the front closure of the front portion of the body portion.

2. The flotation vest as set forth in claim 1, wherein the auxiliary portion is wholly removable from the body portion.

3. The flotation vest as set forth in claim 1 wherein a first side of said auxiliary portion is releasably connected to said first front portion of the body portion.

4. The flotation vest as set forth in claim 3 wherein a second side of the auxiliary portion is connected to said second front portion of the body portion.

5. The flotation vest as set forth in claim 3 wherein said back section further comprises at least one retainer for maintaining said work surface in a generally horizontal orientation with respect to the back section when the work surface is in the open configuration.

6. The flotation vest as set forth in claim 3 wherein an edge of the front section not comprising a hinge is releasably secured to a corresponding edge of the back section not comprising a hinge.

7. The flotation vest as set forth in claim 1, wherein the auxiliary portion is removably secured to the body portion.

* * * * *